Jan. 24, 1956

C. E. ELLSWORTH 2,732,474

VARIABLE CAPACITOR FOR HIGH-FREQUENCY
DIELECTRIC HEATING APPLICATOR

Filed Sept. 28, 1953

Jan. 24, 1956 C. E. ELLSWORTH 2,732,474
VARIABLE CAPACITOR FOR HIGH-FREQUENCY
DIELECTRIC HEATING APPLICATOR
Filed Sept. 28, 1953 3 Sheets-Sheet 2

Jan. 24, 1956  C. E. ELLSWORTH  2,732,474
VARIABLE CAPACITOR FOR HIGH-FREQUENCY
DIELECTRIC HEATING APPLICATOR
Filed Sept. 28, 1953  3 Sheets-Sheet 3

United States Patent Office 2,732,474
Patented Jan. 24, 1956

2,732,474

VARIABLE CAPACITOR FOR HIGH-FREQUENCY DIELECTRIC HEATING APPLICATOR

Carl E. Ellsworth, Anchorage, Ky., assignor to National Cylinder Gas Company, Chicago, Ill., a corporation of Delaware Application September 28, 1953, Serial No. 382,526

21 Claims. (Cl. 219—10.55)

This invention relates to a high-frequency dielectric heating applicator and more particularly to provision therein of an improved form of variable capacitor for adjusting the fundamental frequency of the applicator, and has for an object the avoidance of spurious oscillations in circuits resonant at a frequency harmonically related to a fundamental applicator frequency.

During a heating cycle in high-frequency dielectric heating applicators, as the heating progresses, the resultant change in characteristics of the load may cause or require a variation in the heating electrode voltage and/or operating frequency. Efficient operations usually require that the electrode voltage or spacing be varied as the heating cycle progresses, so that the dielectric heater will be fully loaded throughout the heating period. Heaters designed for the removal of moisture from a material, for example, should be provided with means for increasing electrode voltage and/or lowering the upper electrode toward the end of the heating cycle when most of the high power factor moisture has already been driven off. Upon change in electrode voltage or spacing to compensate for change in load characteristics, other adjustments may be made necessary in order that the system operate efficiently; for example, the grid drive circuit of an oscillator tube may have to be adjusted to maintain the grid drive substantially constant.

For each electrode spacing there may be one or more combinations of settings of the electrode voltage adjusting devices and of the grid drive circuit that will place one or more of the aforesaid circuits or devices in harmonic relation to a fundamental frequency of the applicator. The harmonic relation may also be established by a change in operating frequency with change in load characteristic.

Resonance of these circuits or circuit components may cause inefficient operation due to the losses therein and may cause arc-over in some portion of the applicator or in the oscillator circuitry resulting in trip-off of the applicator unit and possibly damage to some of the associated circuit components. Adjustment of the individual circuits and devices to avoid resonance thereof is not at all times feasible because of the possible reduction in the efficiency of the heating system. In such situations the above possibilities of damage and inefficient operation may be avoided by shifting the fundamental frequency of the applicator either before or during operation in order to provide a non-harmonic relation between the resonant frequency of the aforesaid circuit elements or devices and the operating frequency of the applicator.

Accordingly it is an object of the present invention to provide, in a high-frequency dielectric heating system having circuitry and components variable for controlling system loading and which are subject to resonance at harmonics of any operating frequency of the system, a resonant applicator including a pair of capacitive elements at least one of which is movable independently of the electrodes of the applicator to shift the operating frequency of the system so that harmonics thereof differ from the variable resonant frequencies of the circuitry and components of the system.

Further, in accordance with the present invention, there is provided, in a dielectric heating system having an oscillator tube, an applicator, and associated circuitry subject to resonance at harmonics of a fundamental frequency of oscillation, a supplemental capacitive element which is included within the resonant tank circuit of the applicator and which is made adjustable independently of variation in spacing of the heating electrodes of the applicator so as to ensure that the operating frequency of the system is not harmonically related to the resonant frequency of the associated circuitry of the oscillator tube and applicator.

More particularly, in a preferred embodiment of the invention there is provided a supplemental capacitive skirt element which is mounted for slidable movement on a heating electrode of a high-frequency dielectric heating applicator. The heating electrode and the supplemental capacitive skirt are mounted within an electrically conductive housing and shown supported in spaced relation from wall structure of the housing. An inductive fin element is electrically connected at one end to the heating electrode and electrically connected at an opposite end to wall structure of the housing. The housing, the heating electrode and its associated electrode, and inductive structure including fin element, comprise a resonator which determines the operational frequency of the applicator. The spacing between the supplemental capacitive element and one of the walls of the housing is made variable, independently of electrode spacing, to change the total capacitance of the applicator and thereby shift the resonant frequency thereof in avoidance of its resonance at a frequency harmonically related to resonant frequencies of the associated circuitry or components of the dielectric heating system.

For a more detailed understanding of the invention and for further objects and advantages thereof, reference may be had to the following description taken in conjunction with the accompanying drawings, in which:

Fig. 1 discloses in schematic form a typical dielectric heating applicator embodying the present invention;

Figure 2:
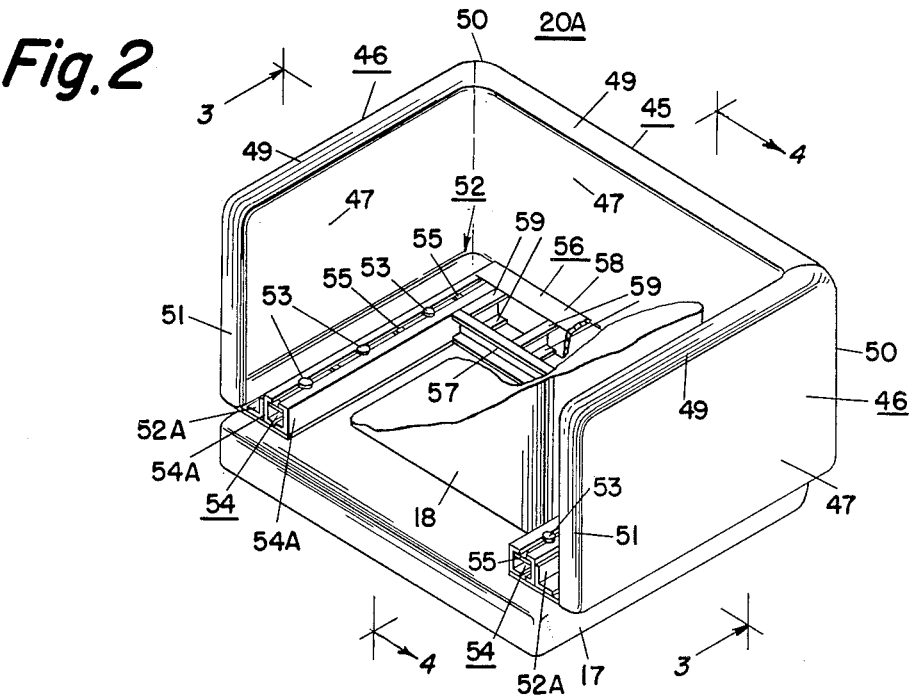
Fig. 2 illustrates in perspective a preferred form of a supplemental capacitive skirt for use in such applicator.
Figure 4:
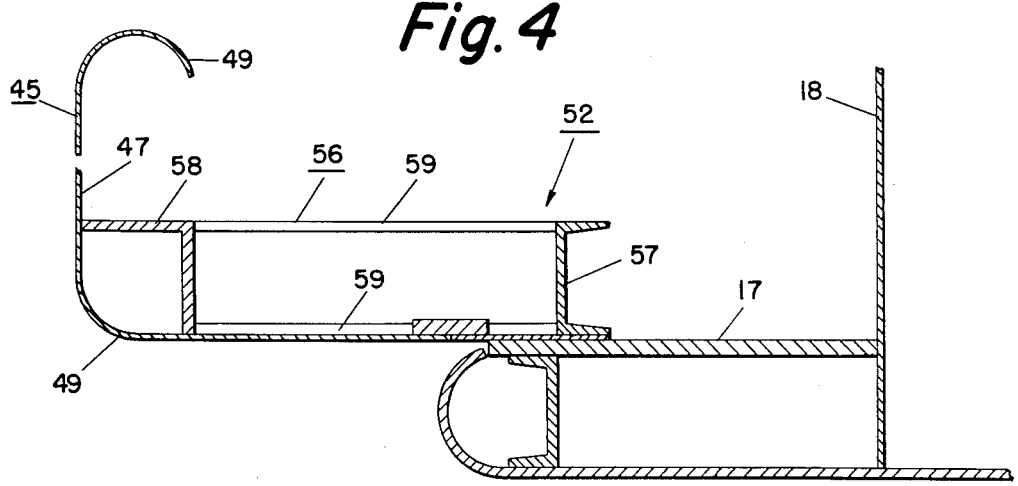
Figure 5:
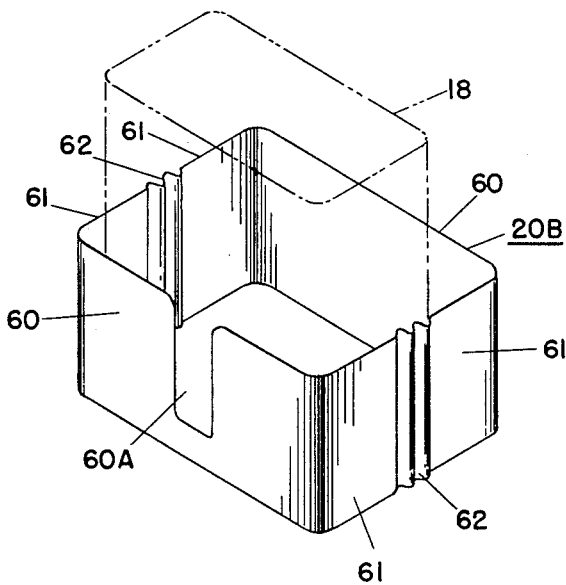
Figure 6:
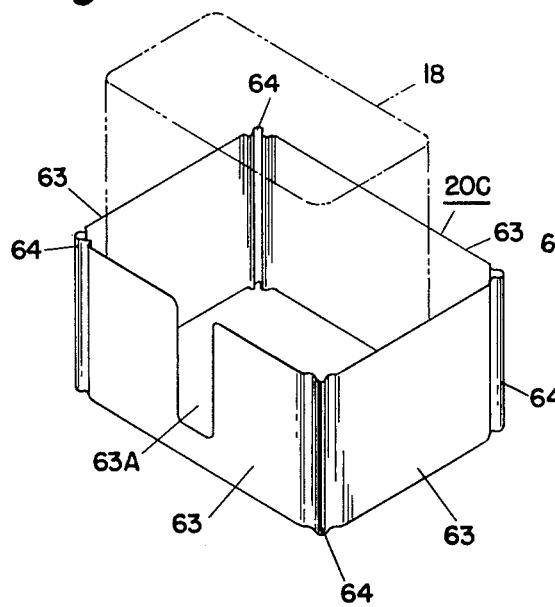
Figure 7:
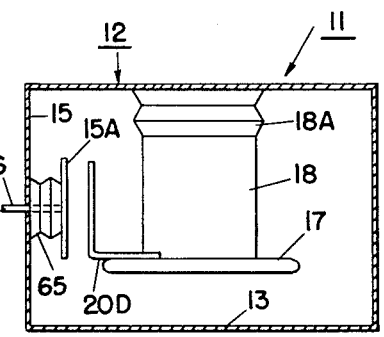

Fig. 4 is an enlarged sectional elevation of that part of the supplemental capacitive skirt including the base portion 45 up to the inductor 18 taken along a line substantially corresponding to line 4—4 of Fig. 2; and Figs. 5–7 schematically illustrate further modifications of the present invention.

Figure 1:
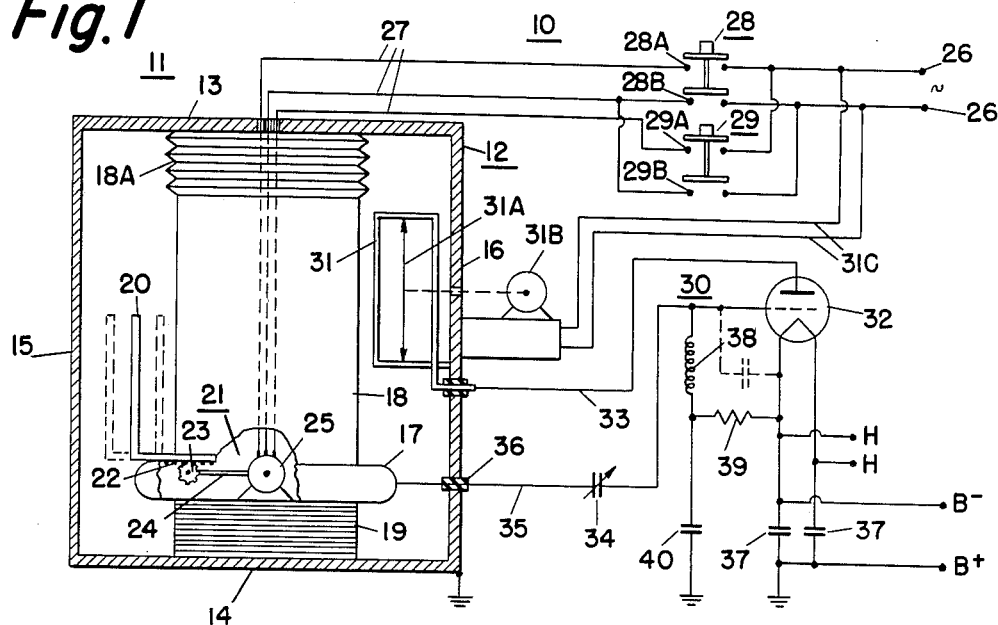

Referring to the drawings, in which like reference characters designate the same parts throughout the several views, and more particularly to Fig. 1, there is disclosed a high-frequency dielectric heating system 10 embodying the present invention. The applicator or heater 11 is shown comprised of an electrically conductive enclosure or housing 12 having horizontal walls 13 and 14 and vertical walls 15 and 16. The housing 12 may be open-ended but is preferably a substantially complete enclosure for the purpose of providing among other things reduction in radiation of the high-frequency fields from its confines.

In this particular embodiment the upper horizontal wall 13 is connected to a heating electrode structure 17 by means of a box-like fin inductor 18, 18A, generally similar to those described in my Patent 2,711,468. As thus far described, the housing 12, inductor 18, 18A, and the electrode 17 define a reentrant cavity applicator generically similar to that of copending Warren application, Serial Number 138,628, filed January 14, 1950, now abandoned in favor of Warren application Serial Number 419,633, filed March 26, 1954.

The upper heating electrode 17 is spaced from the horizontal wall 14 which in the illustrated exemplary embodiment serves as a cooperative lower electrode. The heating of a load 19, which is illustrated as a stack of wallboard subject to pressure during heating, takes place within an electric field produced between the electrodes 14 and 17. The load also may be comprised of other dielectric objects such as, for example, foundry sand cores, plastic preforms, woodworking assemblies or rubber, spaced from the upper heating electrode. A metallic conveyor instead of the housing wall 14 may serve as the lower electrode for continuous processing of work. Alternatively, a non-metallic conveyor may be used to pass work through the inter-electrode space, as between electrodes 14 and 17.

The various circuit components hereinafter referred to in more detail, such as, for example, the coupling loop, the grid-coupling capacitor, the R. F. chokes, the by-pass condensers, etc., and their leads, should be selected with parameters such that their resonant frequencies, or the resonant frequencies of the circuits including them, are non-harmonically related to a fundamental operating frequency of the applicator. Otherwise these circuits, for brevity termed "parasitic circuits," may cause operating difficulties resulting in damage to the load, the oscillator system or both.

During treatment of a load of wallboard, for example, the moisture of the load may vary from a value of approximately 6% at the beginning of a work cycle to a value of approximately 0% at the end of the cycle. With such change in moisture content, there occurs a change in power factor of the load which requires compensatory changes to return the heater loading to the desired value. Such compensation, in the case of treatment of wallboard and the like where it usually is desirable that the upper electrode rest on the material, may be effected by adjustment of electrode voltage. In other cases, such compensation may be effected also by adjustment of electrode spacing. Also, where the electrode voltage is changed to a new value as the heating cycle progresses, the setting of the grid-coupling capacitor may be changed to maintain constant grid drive on the oscillator tube. In consequence of any of such changes, the resonant frequency of one or more of the parasitic circuits such as referred to above may be brought into harmonic relation with the operating frequency of the applicator, whereupon the aforesaid operational difficulties are experienced. Also, there may be the further complication that parasitic oscillations may be caused by excitation of the reentrant cavity applicator at one of its higher modes, with the result that it delivers little or no power to the load, or concentrates the heating at localized spots in the load.

Furthermore, changes in loading and electrode voltage and/or spacing may cause changes in operating frequency of the applicator of sufficient amount to disturb the desired non-harmonic relation between the operating frequency and potentially parasitic circuits.

In accordance with the present invention, the resonant frequency of the applicator 11 is varied by means of a supplemental capacitive element or skirt 20 mounted on the heating electrode 17 in variable spaced relation to the side wall 15 of the housing 12. The sidewall 15 is a capacitive element and with the skirt 20 forms a variable capacitor. The capacitance between skirt 20 and sidewall 15 and the capacitance between electrodes 14 and 17 together comprise substantially all of the capacitance of the reentrant cavity applicator. Consequently, the spacing between the skirt 20 and the wall 15 of the housing 12 may be adjusted independently of the spacing of electrodes 14 and 17, to shift the operating frequency to maintain a non-harmonic relation with respect to the parasitic circuits or modes despite the aforesaid adjustments required for efficient heating of the load.

As illustrated, the supplemental capacitive area of skirt 20 is comprised of sheet metal of a size determined by the amount of additional capacitance required in the applicator to which the invention is to be applied. The skirt 20 extends upwardly from the heating electrode 17 and is spaced from the fin inductors 18, 18A and all the walls of the housing 12. The skirt 20 is preferably in spaced parallel relation with the side wall 15 of the housing 12. However, the parallel relation is not necessary, nor is it necessary that the skirt 20 be comprised of solid sheet metal. It may take any suitable form, and may be corrugated, or perforated by louvres to provide for circulation of air between the skirt and inductor 18.

At times the parasitic circuits may be tuned in avoidance of the undesired harmonic relation but this is possible only in instances where the adjustment is of small magnitude not substantially affecting the efficiency of operation of the applicator.

The individual tuning of the component parts or potentially parasitic circuits of the applicator and oscillator tube may prove efficacious, and is often done, where the fundamental operating frequency of the reentrant cavity resonator is maintained substantially constant or varied within a limited range. For example, as indicated by lines 1 and 2 of the table below, frequency change swithin a range of 2 megacycles leave spaces or gaps in the frequency spectrum between all the harmonics shown. The various adjustable components may be tuned in such gaps.

| Frequency in Megacycles | Harmonic Range | | | |
|---|---|---|---|---|
| | 2nd | 3rd | 4th | 5th |
| 12-13 | 24-26 | 36-39 | 48-52 | 60-65 |
| 12-14 | 24-28 | 36-42 | 48-56 | 60-70 |
| 12-15 | 24-30 | 36-45 | 48-60 | 60-75 |
| 12-16 | 24-32 | 36-48 | 48-64 | 60-80 |
| 12-17 | 24-34 | 36-51 | 48-68 | 60-85 |

However, such tuning as described above is not feasible where the operating frequency of the applicator varies widely and to such extent that the harmonic frequency ranges overlap. For example, by reference to the last three lines of the table above it will be seen that where the range of operating frequency is from approximately 12 to 15 megacycles there is overlap, as underscored, of the fourth and fifth harmonic ranges; and where the operating frequency varies over a range from 12 to 16 megacycles the overlap further includes the underscored third harmonic. Thus, for the ranges of fundamental frequency often used in dielectric heating, there are no gaps in the frequency spectrum beyond the third harmonic range.

It is readily apparent, therefore, from the above table that tuning of the individual potentially parasitic circuits in avoidance of harmonic relationships is not possible for the wide fundamental frequency ranges likely to be encountered in dielectric heating.

In accordance with the present invention, the operating frequency of the applicator is adjusted so as always to provide gaps in the frequency spectrum within which the various potentially parasitic elements or circuits may be tuned, in avoidance of a harmonic relationship with the operating frequency.

Many various types of oscillator circuits may be used with the applicator 11; the particular oscillator 30 illustrated being generically similar to one described and claimed in the aforesaid Warren application Serial Number 419,633. Specifically, a coupling loop 31 within the metallic housing 12 inductively couples the resonant applicator 11 to the plate or anode circuit of the oscillator tube 32. One end of the coupling loop 31 is conductively connected to the wall structure 16 and the other end of the loop is connected by conductor 33 to the anode of tube 32. The coupling may be varied to effect change in electrode voltage by means of a shorting bar 31A movable across the loop 31 by any mechanical device such as reversible motor 31B. The motor 31B is energized from a supply represented by terminals 26, 26 by way of conductors 31C. The coupling loop arrangement is merely exemplary of a single type. For other types of coupling loop arrangements and adjusting devices, therefore, reference may be had to my copending application Serial Number 382,525, filed September 28, 1953.

The grid of tube 32 is shown in this particular embodiment to be connected to the heating electrode 17 by way of an external variable grid-drive capacitor 34 and a lead 35 passing through an insulator 36 in the side wall 16 of the housing 12. Alternatively, as in the copending Moore application, Serial Number 345,663, filed March 30, 1953, the capacitor 34 may be mounted within the housing 12. The cathode of tube 32, so far as the operating frequency of the oscillator is concerned, is grounded through bypass capacitors 37. A direct-current source of high voltage, B+, B—, is connected between ground and the cathode of tube 32; the terminal B+ being grounded as indicated. A direct-current path between the grid and cathode of tube 32 is provided by radio-frequency choke 38 and grid leak resistor 39.

Alternatively, the negative terminal of the direct-current source of high voltage may be grounded; in such case there may be employed a well known parallel feed arrangement which is not shown but which would include a blocking condenser in series with the coupling loop 31 and a radio-frequency choke connected in series between the plate of the tube and the positive terminal of the high-voltage supply. Heating for the filaments of the oscillator tube is provided from a source (not shown) by way of terminals H, H.

In the oscillator system spurious oscillations, harmonically related to the operating frequency of the applicator, may spasmodically or randomly occur in potentially parasitic circuits inculding such components as the coupling loop 31, the grid-coupling caapcitor 34, the radio-frequency choke 38, cathode bypass capacitor 37 and grid-bypass 40. In practice, it is often difficult to locate the component or combination of components and interconnecting structure and/or leads comprising the parasitic circuit or loop. While it is possible in some instances to avoid generation of such spurious oscillations by detuning or damping the offending parasitic circuit after it has been located, such methods are not always applicable.

In accordance with the present invention, should such spurious oscillations occur, the spacing between wall 15 and skirt 20 is adjusted to shift the operating frequency and so restore a non-harmonic relation to the offending parasitic circuit without even the need to locate it.

In Fig. 1 the spacing between the skirt 20 and the wall 15 is varied by slidably mounting the skirt on the upper electrode 17 for movement toward and away from the wall independently of the position of the electrode. Movement of the skirt 20 may be effected manually or by a driving mechanism 21 comprised of a rack 22 and pinion 23 driven through shaft 24 by reversible motor 25. The driving mechanism 21 is mounted within a field-free space defined by the interior of electrode 17 and fin inductor 18, 18A and therefore, as explained and claimed in copending Warren application, Serial Number 419,070, the various mechanical interconnections may be conductive and the use of insulation is not required.

The motor 25 may be energized from any suitable supply, represented by terminals 26, by way of conductors 27 passing through the field-free space of inductor 18, 18A, and reversing switches 28 and 29. The motor is driven in direction to move the skirt 20 toward wall 15 by closing switch 28 on its contacts 28A and 28B thereby closing the motor circuit to the supply 26. Reversal of the motor 25 is effected through closure of switch 29 on its contacts 29A, 29B.

In the initial adjustment of an applicator embodying the present invention, a predetermined operating frequency range having a non-harmonic relation with the parasitic circuits may be derived by proper setting of the supplemental capacitive skirt 20 with respect to its associated side wall 15. Once the skirt 20 has been set for a given type and size load, it may require no further adjustment as the other parameters are adjusted for the maintenance of proper loading and grid drive during the heating cycle. However, if during an ensuing work cycle, the characteristics of the material being treated vary so extensively as to require a further adjustment of the skirt, this adjustment may be readily accomplished by energizing the driving motor 25 from a remote position as by switches 28, 29, thereby avoiding the necessity of shutting down to make the necessary adjustments manually.

Referring now to Fig. 2, there is illustrated in perspective a preferred embodiment of the supplemental capacitive skirt of the present invention. The capacitive skirt, 20A, is of substantially U-shaped configuration and is slidably mounted on the upper surface of heating electrode 17. A coupling loop, corresponding with coupling loop 31, of Fig. 1, extends over the electrode 17 between the legs of the U. The skirt 20A is adjustable for movement toward and away from a wall of the applicator housing (not shown) opposite the base 45 of the U to vary the spacing therebetween and consequently to vary the capacitance of the capacitor comprising the skirt base 45 and an adjacent wall of the applicator housing. Additional supplement capacitance, having a substantially fixed value throughout the adjustment of the skirt 20A, is afforded by the side or leg portions 46 of the skirt which maintain a fixed distance from their associated adjacent housing walls throughout the range of adjustment of the skirt. The additional fixed capacitance supplied the resonator by the side portions of the skirt 20A increases the overall capacitance of the resonant applicator so that, as more fully set forth in my copending application Serial Number 358,051, filed May 28, 1953, and in said copending Warren application, Serial No. 419,633, changes in capacitance effected by variations in characteristic of the work or by changes in electrode spacing are comparatively small.

Hence the supplemental capacitive area of base 45 may be substantially less than required for example in the modification of Fig. 1 in which the skirt 20 does not have the fixed supplemental capacitive side portions 46, 46.

The skirt 20A is comprised of a plurality of conductive sheets 47 of aluminum, or the like, secured together by any suitable means to provide the continuous surface areas of the base 45 and side portions 46. The skirt 20A is provided with rounded edges 49 and corners 50 in avoidance of current concentrations induced from the circulating high-frequency electromagnetic field, and in avoidance of electric field concentrations that may cause arcing. For like reasons, the exposed ends of the skirt 20A may be capped with rounded sections 51.

Figure 3:
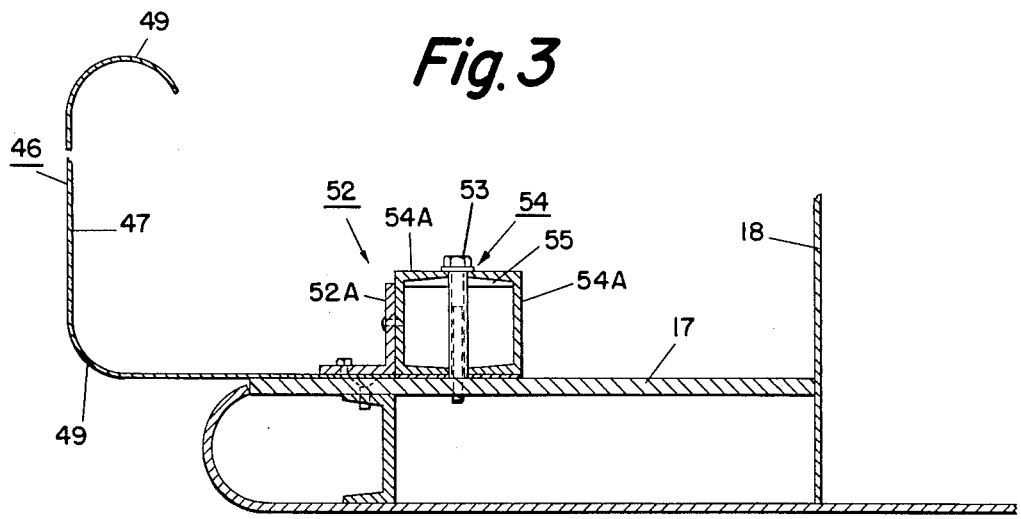
Fig. 3 is an enlarged sectional elevation of that part of the capacitive skirt including only the left-hand side portion 46, taken along a line substantially corresponding to line 3—3 of Fig. 2.

The conductive sheets 47 defining the capacitive areas of the skirt 20A are supported by a rigid framework 52 (Figs. 2, 3, 4), slidably mounted on the upper surface of the electrode 17. The framework 52 includes a pair of spaced angle members 52A to the underside of which the sheets 47 are secured. The skirt 20A is guided in straight line movement by a plurality of machine bolts 53 (Figs. 2, 3) securely fastened to the electrode 17 and extending through a pair of box-like structures 54, each secured to a respective angle member 52A and spaced on opposite sides of the fin inductor 18. Each of the structures 54 may be comprised of a pair of channel members 54A spaced apart a distance substantially equal to the diameter of the machine bolts 53 and maintained in such spaced relation by a plurality of transverse metallic straps 55 (Fig. 2). The metallic straps 55 also function as stops to limit the extent of adjustment of the base 45 of the skirt 20A toward and away from its associated housing wall.

The variable capacitive area or base 45 of skirt 20A, which may extend a substantial distance over the edge of the electrode 17, is reinforced against flexing by a box-like forward portion 56 (Fig. 4) of the framework 52. The forward portion comprises a channel member 57 substantially extending the width of the skirt and secured to the structures 54, 54 and an angle member 58 which is secured to the skirt 20A and connected to the channel member by a plurality of cross bars 59.

In the modification of Fig. 5, the skirt 20B is shown comprised of two substantially U-shaped sections 60 whose legs 61 are joined by accordion pleated sheets 62 of conductive material. One of the sections 60 may be provided with a slot 60A for receiving a coupling loop, not shown, but which may be similar to the coupling loop 31 of Fig. 1. The double U skirt 20B completely surrounds the lower portion of the inductor or fin 18 and its U-shaped sections 60 are movable separately, or jointly in opposite direction, toward their respective side walls of the housing (not shown) and thereby afford a greater range of variation in total capacitance of a dielectric heating applicator resonator than that provided by the structure of Figs. 1 and 2.

Where still greater ranges of variations may be required, a skirt may take the form of that schematically illustrated in Fig. 6 wherein the skirt 20C is comprised of four separately movable sections 63 joined at the corners by accordion pleated conductive sheet metal 64 to form a structure substantaily rectangular in section and completely enclosing the lower portion of the fin 18. Similar to the embodiment of Fig. 5 and for like reasons one of the sections 63 may be provided with a slot 63A. Each of the capacitive sections 63 of the skirt 20C, Fig. 6, may be mounted for movement independently of or together with any of the other sections.

In the modification of Fig. 7, a capacitive plate element 15A is mounted on side wall 15 of the housing 12 by way of a metallic bellows structure 65 and is movable toward and away from an associated capacitive plate element or skirt 20D securely mounted to an upper surface of the heating electrode 17. Movement of the element 15A toward and away from its associated capacitive plate 20D will vary the overall capacitance of the reentrant cavity applicator in a manner similar to the embodiment of the capacitive skirt 20 shown in Fig. 1. Although the capacitive plate 20D is preferably rigidly mounted to the electrode, it may be mounted in a slidable manner such that adjustment of the applicator capacitance may be had by movement of either element 15A or plate 20D, or both. It is to be further understood that more than one movable plate element 15A may be mounted on a given wall of the applicator housing 12 and that, space permitting, these movable elements may be mounted on all four inner surfaces of the housing or any combination thereof for coaction with associated capacitive plates either rigidly or movably mounted on the heating electrode.

An advantage of mounting the movable element of the supplemental capacitor on the side wall of the housing is in the ease with which the spacing between the element 15A and the plate 20D may be varied. Such adjustment may be effected by means of a rod 66 passing through the side wall 15 within a field-free space encompassed by the bellows 65 and attached at one end to the capacitive element 15A. The rod 66 is at ground potential and may be reciprocated to effect movement of the element 15A either manually or by the use of some motor-driven device.

While preferred modifications of the invention have been disclosed, it is to be understood that further modifications may be made within the spirit and scope of the appended claims.

What is claimed is:

1. In a dielectric-heating applicator which is the frequency-determining circuit of an oscillator, an electrically conductive housing, a heating electrode within said housing and spaced from wall structure thereof, an inductance element electrically connected at one end to said electrode and at the opposite end electrically connected to wall structure of said housing, a supplemental capacitive element supported by said heating electrode and extending therefrom in spaced relation to the wall structure of said housing, and means independent of movement of said heating electrode for varying the spacing between said supplemental capacitive element and an associated opposite wall of said housing to change the resonant frequency of said applicator.

2. In a dielectric heating applicator which is the frequency-determining circuit of an oscillator, an electrically conductive housing, a heating electrode within said housing and spaced from wall structure thereof, an extensible fin structure electrically connected at one end to said electrode and at the opposite end electrically connected to wall structure of said housing, at least a portion of said fin structure being movable with movement of said heating electrode in variation of the height of said heating electrode to accommodate work of various sizes, a supplemental capacitive element supported by said heating electrode and extending therefrom in spaced relation to said fin structure and the walls of said housing, and means operable independently of movement of said electrode for varying the spacing between said capacitive element and a wall of said housing in a direction normal to the direction of movement of said fin structure and electrode to change the resonant frequency of said applicator.

3. A dielectric-heating applicator comprising an electrically conductive housing, a heating electrode within said housing and spaced from wall structure thereof, an inductance element electrically connected at one end to said electrode and at the opposite end electrically connected to wall structure of said housing, and a supplemental capacitive element supported by said heating electrode and extending therefrom in spaced relation to said inductance element and housing, said supplemental capacitive element being movable relative to said electrode and housing and independent of variation in electrode spacing to vary the resonant frequency of said applicator.

4. In a dielectric-heating applicator which is the frequency-determining circuit of an oscillator, an electrically conductive housing, a heating electrode within said housing and spaced from wall structure thereof, a fin structure electrically connected at one end to said electrode and at the opposite end electrically connected to wall structure of said housing, a supplemental capacitive element supported by said heating electrode and extending therefrom in spaced relation to said fin structure and the walls of said housing, a capacitive plate mounted on a wall of said housing in spaced parallel relation with and opposite to said supplemental capacitive element, and means for moving said capacitive plate to vary the spacing between said plate and said capacitive element to change the resonant frequency of said applicator.

5. In a dielectric heating system having an oscillator tube for supplying high-frequency power to a work circuit and having associated circuitry potentially resonant at harmonics of an operating frequency of said system, an electrically conductive housing, a heating electrode within said housing and spaced from wall structure thereof, a fin structure electrically connected at one end to said electrode and at the opposite end electrically connected to wall structure of said housing, said housing, heating electrode and fin structure defining a resonant applicator determining the operational frequency of the system, and a supplemental capacitive element slidably mounted on said electrode in spaced relation to said fin structure and to the walls of said housing, said supplemental capacitive element being movable relative to the walls of said housing and relative to said electrode to vary the total capacitance of said applicator and thereby shift the operating frequency thereof in avoidance of a harmonic relation with any resonant frequency of the associated circuitry of the oscillator tube.

6. A high-frequency dielectric heating system having a resonant applicator determining the operating frequency of the system and associated circuitry potentially resonant at harmonics of frequencies of the system, said applicator comprising a heating electrode, a cooperative electrode, a first capacitive element mounted on one of said electrodes and conductively connected thereto, a second capacitive element spaced from said first capacitive element and conductively connected to the other electrode, said electrodes and capacitive elements comprising substantially all the capacitance of said applicator, and means supporting at least one of said capacitive elements for movement relative to its associated capacitive element and independent of variation in spacing between said electrodes to shift the operating frequency of said applicator so that the harmonics thereof differ from the resonant frequencies of the associated circuitry of said system.

7. A high-frequency dielectric heating system having a resonant applicator determining the operating frequency of the system, and associated circuitry potentially resonant at harmonics of frequencies of the system, said applicator comprising a heating electrode, a cooperative electrode, a first capacitive element slidably mounted on one of said electrodes and conductively connected thereto, and a second capacitive element spaced from said first capacitive element and conductively connected to the other electrode, said electrodes and capacitive elements comprising substantially all the capacitance of said applicator, said first capacitive element being movable relative to its supporting electrode independently of changes in electrode spacing and also movable relative to said second capacitive element for changing the operating frequency of said applicator to shift the harmonics thereof away from resonant frequencies of the associated circuitry of said system.

8. In a high-frequency dielectric heating system including circuitry and components variable for controlling system loading, said circuitry and components subject to resonance at harmonics of any operating frequency of said system, a resonant applicator for determining an operating frequency of said system, said frequency being subject to change with variations in loading adjustments during a heating cycle, said applicator including an electrically conductive housing and a pair of relatively movable heating electrodes within said housing and spaced from wall structure thereof, and a pair of variably spaced capacitive elements, one of which is conductively mounted on one of said heating electrodes, at least one of said capacitive elements being movable relative to its associated capacitive element and independently of variation in electrode spacing for changing the operating frequency of said applicator to shift the harmonics thereof away from the variable resonant frequencies of the circuitry and components of said system.

9. The combination of claim 8 in which one of said capacitive elements is a wall of the housing.

10. The combination of claim 8 in which the capacitive element on one of said heating electrodes is slidably mounted and movable independently of variation in electrode spacing with respect to its associated capacitive element.

11. The combination of claim 8 in which the capacitive element on said electrode is fixedly secured thereto and the other capacitive element is mounted on a wall of said applicator housing for movement relative to its associated capacitive element and independently of variation in electrode spacing.

12. In a high-frequency dielectric heating system including circuitry and components subject to resonance at harmonics of operating frequencies of the system, an applicator for determining an operating frequency of said system subject to change with variations in loading during a heating cycle, said applicator including an electrically conductive housing, a heating electrode within said housing and spaced from wall structure thereof, and a supplemental capacitive element mounted on said electrode and conductively connected thereto, said housing, electrode and capacitive element comprising substantially all of the capacitance of said applicator, said supplemental capacitive element being movable along said electrode and relative to a wall of said housing for changing the operating frequency of said applicator to shift the harmonics thereof away from the resonant frequencies of the circuitry and components of said system.

13. The combination of claim 12 in which said supplemental capacitive element is comprised of a substantially U-shaped structure extending vertically from said heating electrode and having its capacitive surfaces substantially parallel with the walls of said housing, said capacitive element being movable in a direction to vary the spacing between a wall of said housing and the base portion of said U-shaped structure.

14. The combination of claim 12 in which the spacing between a wall of said housing and said supplemental capacitive element may be adjusted prior to a heating cycle to predetermined a fundamental frequency range whose significant harmonics do not coincide with the natural resonant frequencies of the circuitry and elements of said system during the heating cycle, and in which adjustment of said heating electrode is ineffective to vary the adjusted element.

15. The combination of claim 12, in which said supplemental capacitive element is comprised of at least two substantially U-shaped structures movable on said heating electrode and in direction toward opposite walls of said housing.

16. The combination of claim 12, in which said supplemental capacitive element is comprised of four capacitive areas each associated with and variably spaced from a different wall of the said housing.

17. A combination of claim 12 in which the fundamental operational frequency of said system varies during a heating cycle, and in which a means is provided for moving said capacitive element along said electrode to change the spacing between a wall of said housing and said supplemental capacitive element during the heating cycle in compensatory manner to maintain the operational frequency of said system substantially constant.

18. In a dielectric heating system of the type including an applicator which forms the frequency-determining circuit of an oscillator and is excited through a coupling loop connected in the anode circuit of an oscillator tube, said system including circuitry and components subject to resonance at harmonics of operating frequencies of the system, said applicator comprising a conductive housing, inductance structure therein comprising at least one inductive element projecting into the interior of said housing, spaced electrode structures cooperative to produce an electric field space within the housing, one of which electrodes is disposed at the inwardly projecting end of said inductive element in spaced relation to wall structure of the housing and electrically connected with said wall structure through said inductive element, supplemental capacitive structures connected in parallel with said electrode structures, said wall structure completing a resonant circuit whose frequency is determined by the inductance of said inductance structure, the capacitance between said electrode structures and the capacitance between said supplemental capacitive structures, one of said supplemental capacitive structures being vertically disposed and slidably mounted on said one electrode structure, said one supplemental capacitive structure extending at least partially about said inductance element and provided with a gap for receiving a loop to be coupled to said inductance element for exciting said applicator, said supplemental capacitive element being movable relative to said one electrode for changing the frequency of oscillation of the oscillator to shift the harmonics thereof away from the resonant frequencies of the circuitry and components of said system.

19. A dielectric heating applicator, comprising an electrically conductive housing, a pair of relatively movable electrodes for receiving a load to be heated, an inductance element electrically connected at one end to one of said electrodes and at the opposite end electrically connected to the other of said electrodes through wall structure of said housing, a pair of variably spaced supplemental capacitive elements, one of said capacitive elements being electrically connected to said one electrode, the other of said capacitive elements being electrically connected to the other of said electrodes through a circuit including wall structure of said housing, and means independent of variation in spacing between said electrodes for varying the spacing between said supplemental capacitive elements to change the resonant frequency of said applicator.

20. A dielectric heating applicator, comprising an electrically conductive housing, a pair of variably spaced electrodes within said housing for receiving a load to be heated, a pair of supplemental capacitive structures, one of said capacitive structures being electrically connected to one of said heating electrodes, the other of said capactive structures being electrically connected to the other of said electrodes by way of a circuit including wall structure of said housing, the said electrodes and said capacitive structures comprising substantially all of the capacitance of said applicator, at least a portion of one of said capacitive structures being variably spaced with respect to a portion of the other of said capacitive structures, and means independent of variation in electrode spacing for adjusting the spacing between said portions of said capacitive structures to change the resonant frequency of said applicator.

21. A dielectric heating applicator, comprising an electrically conductive housing, a pair of relatively movable electrodes within said housing for receiving a load to be heated, a pair of supplemental capacitive structures, an inductance element electrically connected at one end to one of said heating electrodes through wall structure of said housing and electrically connected remotely from said one end to the other of said heating electrodes and to one of said supplemental capacitive structures, the other of said supplemental capacitive structures being electrically connected to said one of said heating electrodes through wall structure of said housing, and means independent of variation in spacing between said electrodes for varying the spacing between said supplemental capacitive structures to change the resonant frequency of said applicator.

References Cited in the file of this patent

UNITED STATES PATENTS

| | | |
|---|---|---|
| 2,124,029 | Conklin et al. | July 19, 1938 |
| 2,197,124 | Conklin | Apr. 16, 1940 |
| 2,438,477 | Dodds et al. | Mar. 23, 1948 |
| 2,467,782 | Schuman | Apr. 19, 1949 |
| 2,504,109 | Dakin et al. | Apr. 18, 1950 |

FOREIGN PATENTS

| | | |
|---|---|---|
| 556,292 | Great Britain | Sept. 28, 1943 |